(12) United States Patent
Xu

(10) Patent No.: US 11,244,348 B2
(45) Date of Patent: Feb. 8, 2022

(54) BLOCKCHAIN-BASED TRAFFIC STATISTICS COLLECTION METHODS, APPARATUSES, AND DEVICES

(71) Applicant: Advanced New Technologies Co., Ltd., Grand Cayman (KY)

(72) Inventor: Dafeng Xu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/241,806

(22) Filed: Apr. 27, 2021

(65) Prior Publication Data

US 2021/0248639 A1  Aug. 12, 2021

Related U.S. Application Data

(63) Continuation of application No. PCT/CN2020/070517, filed on Jan. 6, 2020.

(30) Foreign Application Priority Data

Mar. 7, 2019  (CN) .......................... 201910170781.1

(51) Int. Cl.
  *G06Q 30/02* (2012.01)
  *H04L 9/06* (2006.01)

(52) U.S. Cl.
  CPC ....... *G06Q 30/0246* (2013.01); *H04L 9/0618* (2013.01); *H04L 9/0643* (2013.01); *H04L 2209/38* (2013.01)

(58) Field of Classification Search
  CPC . G06Q 30/0246; H04L 9/0618; H04L 9/0643; H04L 2209/38
  See application file for complete search history.

(56) References Cited

U.S. PATENT DOCUMENTS

| | | | |
|---|---|---|---|
| 2017/0364698 A1* | 12/2017 | Goldfarb | ............... H04L 9/3239 |
| 2018/0101448 A1 | 4/2018 | Ventura et al. | |
| 2018/0139180 A1* | 5/2018 | Napchi | ................. G06F 21/554 |

(Continued)

FOREIGN PATENT DOCUMENTS

| | | |
|---|---|---|
| CN | 108596623 | 9/2018 |
| CN | 108596649 | 9/2018 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Scott C Anderson
(74) *Attorney, Agent, or Firm* — Fish & Richardson P.C.

(57) ABSTRACT

A computer-implemented method, medium, and system are disclosed. In one computer-implemented method performed by a blockchain node in a blockchain network, a traffic access request triggered by event tracking is received at the blockchain node. In response to receiving the traffic access request, traffic recording logic in a smart contract published on a blockchain is invoked at the blockchain node. Traffic statistic information of current traffic access is recorded in response to invoking the traffic recording logic. The traffic statistic information is published to the blockchain.

14 Claims, 3 Drawing Sheets

(56) References Cited

U.S. PATENT DOCUMENTS

| | | | |
|---|---|---|---|
| 2018/0198794 A1* | 7/2018 | Huh | H04L 9/0637 |
| 2018/0227119 A1* | 8/2018 | Bibera | H04L 63/083 |
| 2018/0234496 A1* | 8/2018 | Ratias | A63F 13/60 |
| 2018/0315047 A1 | 11/2018 | Kennedy et al. | |
| 2018/0316492 A1* | 11/2018 | Ramachandran | H04L 9/3239 |
| 2019/0058697 A1* | 2/2019 | Chang | H04L 9/3247 |
| 2019/0108499 A1* | 4/2019 | Liu | G06Q 30/0242 |

FOREIGN PATENT DOCUMENTS

| | | | |
|---|---|---|---|
| CN | 108600975 | 9/2018 | |
| CN | 108648079 | 10/2018 | |
| CN | 108665253 | 10/2018 | |
| CN | 108810868 | 11/2018 | |
| CN | 108880934 | 11/2018 | |
| CN | 109035018 | 12/2018 | |
| CN | 110061887 | 7/2019 | |
| EP | 3675016 A1 * | 7/2020 | G06Q 30/0205 |
| TW | 201810148 | 3/2018 | |
| WO | WO 2018065411 | 4/2018 | |

OTHER PUBLICATIONS

PCT International Search Report and Written Opinion in International Application No. PCT/CN2020/070517, dated Apr. 1, 2020, 9 pages (with partial English translation).

Ali et al. "Blockchain-based Decentralized Data Storage and Access Framework for PingER," Aug. 2018, 2018 17th IEEE International Conference On Trust, Security And Privacy In Computing And Communications/12th IEEE International Conference On Big Data Science And Engineering, 6 pages.

Ali et al. "Secure Data Provenance in Cloud-centric Internet of Things via Blockchain Smart Contracts," Oct. 2018, 2018 IEEE SmartWorld, Ubiquitous Intelligence & Computing, Advanced & Trusted Computing, Scalable Computing & Communications, Cloud & Big Data Computing, Internet of People and Smart City Innovations, 8 pages.

Extended European Search Report in European Application No. 20765688.5, dated Nov. 23, 2021, 11 pages.

* cited by examiner

US 11,244,348 B2

BLOCKCHAIN-BASED TRAFFIC STATISTICS COLLECTION METHODS, APPARATUSES, AND DEVICES

CROSS-REFERENCE TO RELATED APPLICATIONS

This application is a continuation of PCT Application No. PCT/CN2020/070517, filed on Jan. 6, 2020, which claims priority to Chinese Patent Application No. 201910170781.1, filed on Mar. 7, 2019, and each application is hereby incorporated by reference in its entirety.

TECHNICAL FIELD

The present disclosure relates to the field of blockchain technologies, and in particular, to blockchain-based traffic statistics collection methods, apparatuses, and devices.

BACKGROUND

Collecting traffic statistics through event tracking is a common traffic statistics collection method. Event tracking through mobile devices is used as an example. Since the mobile Internet era, mobile devices have become daily life necessities for users and the main battle field where Internet platform companies can operate traffic and the quantity of daily active users. Internet products have many sources of traffic, possibly including search engines, advertising promotions, and third-party platforms in addition to direct traffic. When traffic is introduced through third-party platforms, to ensure correct traffic data, cooperating parties usually collect statistics about event tracking traffic separately and finally perform confirmation and traffic settlement. However, inconsistency in traffic statistics collection often occurs in the settlement, and sometimes there can be significant differences, resulting in a large quantity of audit difficulties and increased communication costs.

SUMMARY

In view of this, one or more embodiments of the present specification provide blockchain-based traffic statistics collection methods and apparatuses to improve accuracy of traffic statistics.

The one or more embodiments of the present specification are implemented by using the following technical solutions:

According to a first aspect, a blockchain-based traffic statistics collection method is provided. The method includes the following: a traffic access request triggered by event tracking is received; in response to the traffic access request, traffic recording logic stated in a smart contract published on a blockchain is invoked to record traffic statistics information for current traffic access; and the traffic statistics information is published to the blockchain.

According to a second aspect, a blockchain-based traffic statistics collection apparatus is provided. The apparatus includes the following: a request receiving module, configured to receive a traffic access request triggered by event tracking; an information recording module, configured to, in response to the traffic access request, invoke traffic recording logic stated in a smart contract published on a blockchain to record traffic statistics information for current traffic access; and an information publishing module, configured to publish the traffic statistics information to the blockchain.

According to a third aspect, a blockchain-based traffic statistics collection device is provided. The device includes the following: a processor; and a memory, configured to store a machine-executable instruction, where the processor can implement the blockchain-based traffic statistics collection processing according to any of the embodiments of the present specification by reading and executing the machine-executable instruction that is stored in the memory and corresponds to blockchain-based traffic statistics collection logic.

According to the blockchain-based traffic statistics collection methods, apparatuses, and devices in one or more embodiments of the present specification, parties involved in traffic statistics collection agree on transparent contract content before cooperation. As a smart contract is plaintext, open, and transparent, black box problems in the parties' respective systems are resolved, and distrust between the parties is dispelled. In addition, the cooperating parties automatically perform traffic statistics collection by using a smart contract, thereby improving accuracy of traffic statistics.

BRIEF DESCRIPTION OF DRAWINGS

To describe the technical solutions in one or more embodiments of the present specification or in the existing technology more clearly, the following briefly describes the accompanying drawings used for describing the embodiments or the existing technology. Clearly, the accompanying drawings in the following description merely show some embodiments described in the one or more embodiments of the present specification, and a person of ordinary skill in the art can still derive other drawings from these accompanying drawings without creative efforts.

DETAILED DESCRIPTION

Figure 1:
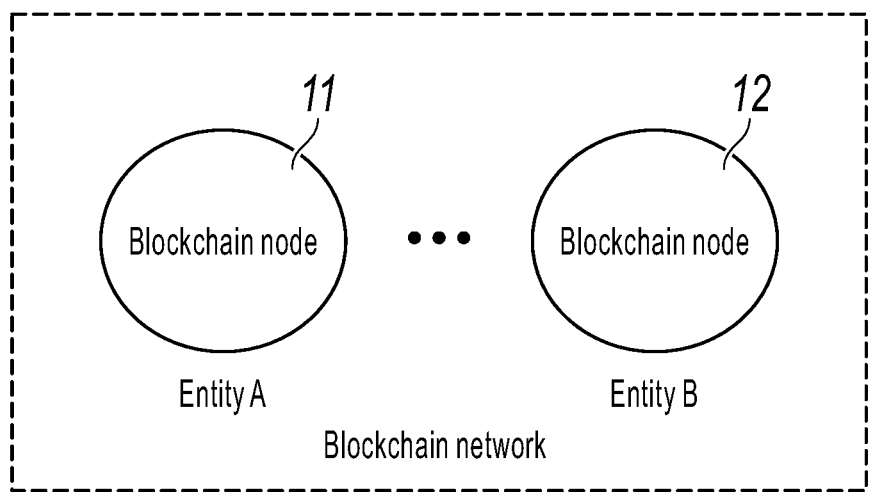
FIG. 1 is a schematic diagram illustrating a blockchain network, according to at least one embodiment of the present specification.

To make a person skilled in the art understand the technical solutions in one or more embodiments of the present specification better, the following clearly and completely describes the technical solutions in the one or more embodiments of the present specification with reference to the accompanying drawings in the one or more embodiments of the present specification. Clearly, the described embodiments are merely some but not all of the embodiments of the present specification. All other embodiments obtained by a person of ordinary skill in the art based on the one or more embodiments of the present specification without creative efforts shall fall within the protection scope of the present disclosure.

Notably, steps of a corresponding method in another embodiment are not necessarily performed in a sequence shown and described in the present specification. In some other embodiments, the method can include more or less steps than steps described in the present specification. In addition, a single step described in the present specification may be divided into multiple steps for description in other embodiments; and multiple steps described in the present specification may be combined into a single step for description in other embodiments.

Collecting traffic statistics based on event tracking is a common traffic statistics collection method. This method can be used to monitor a user's operation behavior on a graphical interface. For example, to count the quantity of button click events on a certain page, an embedded Software Development Kit (SDK) can be initialized when an APP or a graphical interface is initialized, and a corresponding method in the SDK can be invoked when the Button event occurs to obtain statistics on the click event. The event tracking traffic statistics collection can be applied to collecting statistics about traffic conversion of a website. For example, one of traffic sources of an Internet product is traffic introduced through a third-party platform. If the third-party platform and the Internet product separately perform traffic statistics collection and finally perform confirmation and traffic settlement, traffic statistics may be inconsistent. For example, the quantity of traffic access times counted by one party is N, but the quantity of traffic access times counted by the other party is M or even a very different value.

According to a method provided in at least one embodiment of the present specification, event tracking traffic statistics collection is performed by using a blockchain and a smart contract. Parties involved in traffic statistics collection agree on transparent contract content before cooperation. As a smart contract is plaintext, open, and transparent, black box problems in the parties' respective systems are resolved, and distrust between the parties is dispelled. In addition, the cooperating parties no longer need to collect traffic statistics separately, but automatically collect traffic statistics by using the smart contract.

Blockchains described in the present specification can specifically include a private blockchain, a public blockchain, and a consortium blockchain, etc. No specific limitation is imposed in the present specification.

For example, in a scenario, the previously described blockchain can be specifically a consortium blockchain that includes a headquarters entity, a branch entity, and an agent entity, etc. as consortium members. An operator of the consortium blockchain can deploy corresponding services based on the consortium blockchain. The previously described headquarters entity, branch entity, and agent entity serving as consortium members each can be used as a service node of the aforementioned services. Each service node can publish invoices and digital digests generated or received by the service node to the consortium blockchain in a form of transaction, and store the transaction in a distributed database in the consortium blockchain after consensus nodes in the consortium blockchain perform consensus processing on the transaction, so as to complete storage of the transaction information "on the blockchain".

It should be noted that a transaction (transaction) described in the present specification refers to a piece of data that is created by using a client device of a blockchain and that needs to be finally published to a distributed database of the blockchain.

Generally, a transaction in a blockchain can be a transaction in a narrow sense and a transaction in a broad sense. A transaction in the narrow sense refers to a value transfer published by a user to a blockchain. For example, in a conventional bitcoin blockchain network, a transaction can be a transfer initiated by a user in the blockchain. A transaction in the broad sense refers to a piece of service data that is published by a user to a blockchain and that has a service intention. For example, an operator can establish a consortium blockchain based on an actual service need, and deploy some other types of online services (for example, a data recording service and an anti-counterfeit verification service) that are unrelated to a value transfer in the consortium blockchain. In such a consortium blockchain, a transaction can be a service message or a service request that is published by a user in the consortium blockchain and that has a service intention.

The previously described client device can include any type of upper-layer application that implements a specific service function by using underlying service data stored in a blockchain as data support.

In blockchain technologies, nodes in a blockchain can operate blocks usually by relying on a corresponding smart contract. For example, operations such as storing, modifying, and deleting in a blockchain all need to rely on a smart contract. The smart contract can be a computer protocol that is intended to be applied to and deployed on a blockchain and that can propagate, verify, or execute a contract in an information-based way. Stating service logic in a smart contract can implement corresponding operations. A smart contract allows for trusted transactions without third parties. These transactions are traceable and irreversible. Smart contracts can provide security higher than security enabled by conventional contract methods and reduce other transaction costs associated with contracts. A smart contract can usually be locally deployed on a blockchain node. When the node needs to perform an action, the node can invoke and run a corresponding smart contract to execute service logic stated in the smart contract, so as to obtain an execution result.

FIG. 1 illustrates a blockchain network. In the embodiments of the present specification, for example, the blockchain network can be specifically a consortium blockchain network that includes multiple nodes. For example, assuming that event tracking traffic settlement involves entity A and entity B, entity A can introduce traffic for entity B through a platform of entity A. To resolve inconsistency in traffic statistics collection, entity A and entity B can each provide at least one node to access a blockchain network including entity A and entity B.

As shown in FIG. 1, blockchain node 11 can belong to entity A, and blockchain node 12 can belong to entity B. Blockchain node devices can connect to each other by using Transmission Control Protocol/Internet Protocol (TCP/IP). These node devices can be devices such as computers and servers. In the blockchain network, blockchain nodes can synchronize information in a form of P2P network. In a P2P network, nodes can communicate directly with each other, thereby reducing overheads of a central network. Data generated by one node can be broadcast to multiple nodes at the same time. There can be multiple blockchain nodes in a blockchain network. As an example, there are two blockchain nodes in FIG. 1.

A smart contract can be broadcast by one of the blockchain nodes to the other nodes in the blockchain network, and each blockchain node in the blockchain network can store the smart contract and invoke the smart contract at a certain time point to obtain an execution result. The smart contract can be stored in one of blocks of a blockchain ledger.

On a basis that deployment of a blockchain network is complete and a smart contract has been deployed on each blockchain node, the following describes how to implement traffic statistics collection based on the blockchain network and the smart contract.

Figure 2:
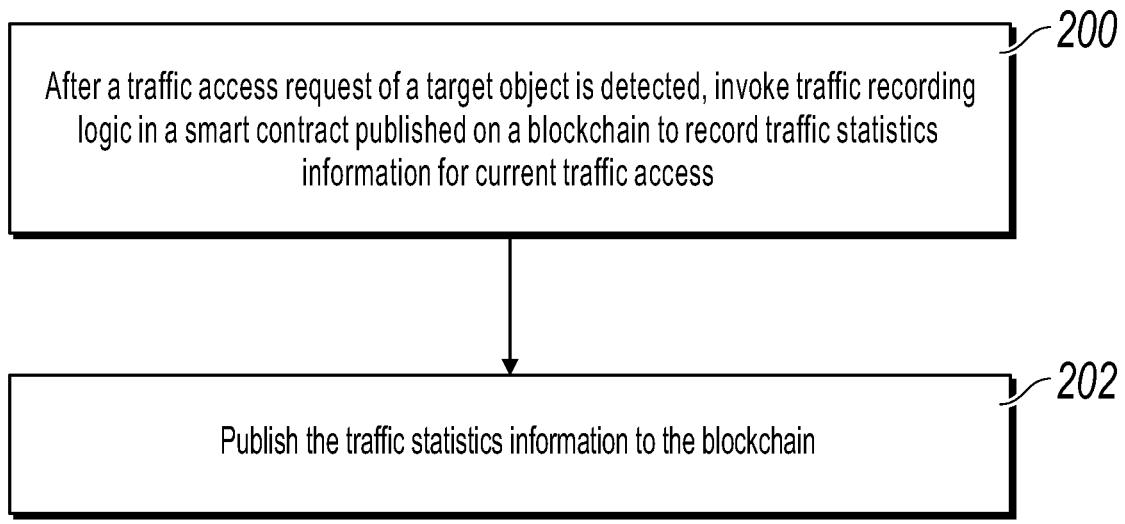
FIG. 2 is a schematic diagram illustrating a traffic statistics collection method, according to at least one embodiment of the present specification.

Referring to a procedure shown in FIG. 2, the procedure can be executed by any blockchain node, and includes the following steps.

In step 200, after a traffic access request triggered by event tracking is received, traffic recording logic in a smart contract published on a blockchain is invoked to record traffic statistics information for current traffic access.

In the present step, the traffic access request triggered by event tracking can be a request for introducing traffic to a target website through a third-party platform. For example, in an application scenario with traffic introduced through a third-party platform, statistics need to be collected on the introduced traffic. For example, if platform A introduces traffic to website a, event tracking can be used to monitor an amount of traffic that is directed to website a through platform A.

Specifically, in the present example, the smart contract is published on the blockchain, and the smart contract can include the traffic recording logic for collecting event tracking traffic statistics.

The traffic recording logic can be code logic that can generate traffic statistics information based on a one-time access traffic event. Information that needs to be recorded can be specified by the code logic. For example, a user ID of current click traffic, a timestamp showing when the traffic is generated, an identifier of a website accessed by the traffic (which can also be referred to as a traffic destination identifier, to be specific, an identifier of a destination of the traffic) can be recorded. Certainly, in actual implementation, content included by the traffic statistics information is subject to data that needs to be collected by event tracking.

A triggering and execution condition of the smart contract can be as follows: When a node receives the traffic access request triggered by event tracking, the node invokes and executes the smart contract, and based on the previously described traffic recording logic in the contract, records related information of current traffic, such as the previously described ID of the user of the current traffic access, the traffic access timestamp, and the traffic destination identifier. The traffic recording logic can be specifically program code (for example, some program methods or functions that can be invoked) that is stated in the smart contract and that is related to execution logic for recording traffic access information.

When detecting user access, each blockchain node can invoke, in the aforementioned way, a smart contract stored on the node to execute traffic recording logic in the contract to obtain traffic statistics information corresponding to the current access.

For example, when a user clicks a website through a third-party platform, event tracking is triggered to collect statistics about current access traffic to the website. A blockchain node can receive a traffic access request triggered by the event tracking, and based on a smart contract stored by the blockchain node, execute the smart contract to obtain traffic statistics information of the event tracking. For example, the traffic statistics information can include information for a one-time traffic event generated at a certain timestamp and corresponding to a certain user ID.

The previously described entity A and entity B are used as examples. Entity A provides a traffic entry platform, and a user can access entity B through the platform. It is equivalent to that entity A can introduce traffic to entity B through the platform. Then, when the user clicks entity B entry in the platform, entity A can detect a current traffic request, and detect that the user accesses entity B from the platform of entity A. Similarly, entity B can also detect the user access. In this case, as a smart contract for traffic statistics collection is deployed on each of the blockchain nodes of entity A and entity B, the smart contract can be executed to obtain traffic statistics information. For example, the traffic statistics information of entity A can record that user 001 generates one request at timestamp t1, and entity B can also record the traffic statistics information.

In the present step, the traffic statistics information recorded by the blockchain node by executing the smart contract can be temporarily recorded in local storage space of the node, for example, can be recorded in a local database. After consensus confirmation by the blockchain node, the traffic statistics information can be recorded in the blockchain.

In step 202, the traffic statistics information is published to the blockchain.

The traffic statistics information obtained by the blockchain node by executing the smart contract can be recorded on the blockchain only after each blockchain node in the blockchain network performs consensus confirmation.

After obtaining the traffic statistics information by executing the smart contract, each blockchain node can synchronize the information to other nodes in the blockchain network so that the nodes in the blockchain network verify the traffic statistics information. The traffic statistics information can be recorded only after each node confirms the traffic statistics information. Logic for the verification can also be negotiated by cooperating parties and presented as information verification logic in the smart contract. The blockchain nodes in the blockchain network can verify the traffic statistics information based on the information verification logic.

In the present step, one of the nodes is used as an example. The node synchronizes the traffic statistics information obtained in step 200 to other blockchain nodes in the blockchain network.

When each blockchain node initially joins the blockchain network, a pair of asymmetric keys can be generated, including a public key and a private key. The public-private key pair is used for encryption when data is synchronized between the blockchain nodes. The following illustrates two encryption transmission methods as examples, but the present specification is not limited thereto. For example, when blockchain node N1 needs to synchronize data to blockchain node N2, N1 can use a public key of node N2 to encrypt traffic statistics information to be synchronized, and then synchronize the traffic statistics information to blockchain node N2. Blockchain node N2 can decrypt and view the traffic statistics information by using a corresponding private key. As another example, node N1 can alternatively use its own private key to encrypt data to be synchronized, and then synchronize a corresponding public key to node N2 so that N2 uses the public key for decryption.

In the present step, each blockchain node in the blockchain network synchronizes traffic statistics information collected by the blockchain node with other blockchain nodes. Each node in a blockchain peer to peer network confirms the traffic statistics information by using a consensus algorithm. When each blockchain node in the blockchain network agrees on the synchronized traffic statistics information through negotiation and reaches a consensus and confirmation, the traffic statistics information can be recorded. For example, if a blockchain update condition is not satisfied, entity A and entity B can store the traffic statistics information in their respective local databases.

In the present example, the traffic statistics information can be recorded in blockchain ledger 14, and both blockchain node 11 and blockchain node 12 store blockchain ledger 14. Blockchain ledger 14 can store traffic statistics information obtained by executing a smart contract. From a data perspective for understanding, data on a blockchain can be data that is common between entities, and the data of the entities can be agreed on through a consensus. Before being recorded, each piece of traffic statistics information needs be confirmed by a blockchain node specified in the consensus algorithm. A consensus process of the blockchain is controlled by each blockchain node.

Figure 3:
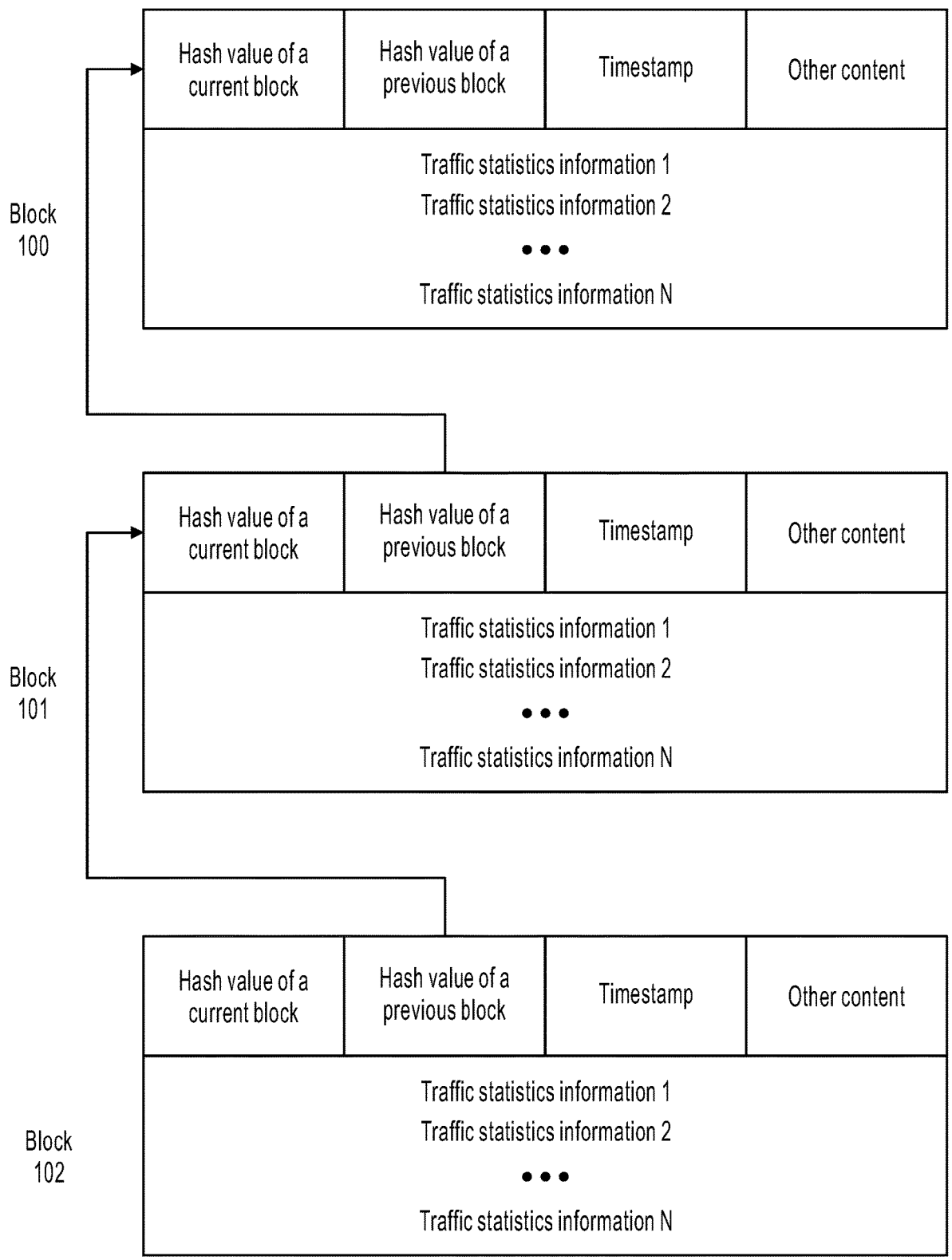
FIG. 3 is a schematic structural diagram illustrating a blockchain, according to at least one embodiment of the present specification.

In the present step, the blockchain update condition can be used to limit a condition for generating a new block. Reference can be made to a schematic structural diagram of a blockchain ledger shown in FIG. 3. As shown in FIG. 3, block 100, block 101, and block 102 are some blocks in the blockchain ledger. Certainly, there can be more blocks, which are not illustrated in FIG. 3. A structure of each block is described as follows.

Traffic statistics information 1 and traffic statistics information 2 in the blocks can be details of traffic statistics. For example, traffic statistics information 1 is that user 001 generates traffic from entity A to entity B at time t1, and traffic statistics information 2 is that user 002 generates traffic from entity A to entity B at time t2. That is, these records each record details of traffic generated each time. Certainly, a specific type of information to be recorded in a record, such as a user identifier and a traffic generation time, can be set in a smart contract after being negotiated by the two cooperating parties.

The blockchain update condition can be a condition for generating a new block in a blockchain. When the blockchain update condition is satisfied, the recorded traffic statistics information can be published to the blockchain. The blockchain update condition can alternatively be agreed on by the two cooperating parties.

For example, when the condition is "a time interval between a current time and a time of generation of a previous block reaches a predetermined interval threshold", a new block is added, and traffic statistics information that is generated in the time interval and that is confirmed by the blockchain network is stored in the new block.

As another example, when the condition can further be "an amount of traffic statistics information verified by a blockchain network reaches a predetermined amount threshold", a new block is added. For example, one new block is added each time 500 pieces of traffic statistics information are recorded, and the 500 pieces of traffic statistics information are stored in the new block. The information has been verified and confirmed by each blockchain node in the blockchain network.

Meanings of fields in each block in FIG. 3 are as follows:
Hash: hash value of a current block;
Prev hash: hash value of a previous block;
Timestamp: timestamp showing when the new block is generated; and
Extra: other content.

In addition, blocks in a blockchain ledger can be connected by filling in a hash value of a previous block in Prev hash in a new block. A smart contract can be stored on one of the blocks in the blockchain ledger, which is not shown in FIG. 3.

A current hash of each block can be calculated as follows: The hash value of the current block can be generated jointly based on all traffic statistics information, a timestamp, and a hash value of a previous block that are stored in the block.

Each blockchain node in the blockchain network records the blockchain shown in FIG. 3. When the blockchain update condition is satisfied, each of the blockchain nodes updates its own blockchain and stores the latest traffic statistics information in a new block of the blockchain.

With the previously described step 200 and step 202, the blockchain is jointly updated and recorded after consensus confirmation by each blockchain node, and the traffic statistics information is stored by using the blockchain.

In addition, content of a smart contract is transparent to both cooperating parties. Logic for recording traffic statistics information in the smart contract can be determined through negotiation between entities that perform traffic statistics settlement. The present example does not limit specific logic content.

The traffic statistics collection method in the present example is implemented by using a blockchain and a smart contract. Such an approach is advantageous in multiple aspects, including:

(1) Parties involved in traffic statistics collection can agree on transparent contract content before cooperation. As a smart contract is plaintext, open, and transparent, black box problems in the parties' respective systems are resolved, and distrust between the parties is dispelled. In addition, the cooperating parties alternatively do not collect traffic statistics separately, but automatically collect traffic statistics by using the smart contract. Therefore, costs of both parties are greatly reduced.

(2) The obtained traffic statistics information is secure: Distributed deployment of blockchain nodes enables content of each node to be consistent and have stronger robustness. No impact is caused even if a single storage medium is damaged. In addition, when blockchain nodes interact with each other to synchronize data, encryption can be used so that an unauthorized user cannot parse data even if the user can access the data. The linked structure generates a hash value when a new block is generated, thereby featuring a tamper-resistant capability and relatively high trustworthiness of data.

(3) Traceability: Cooperating parties can access a block record in a blockchain at any time by using a private key. For example, the parties can trace a transaction by using a timestamp and a hash, so that each transaction can be checked.

Figure 4:
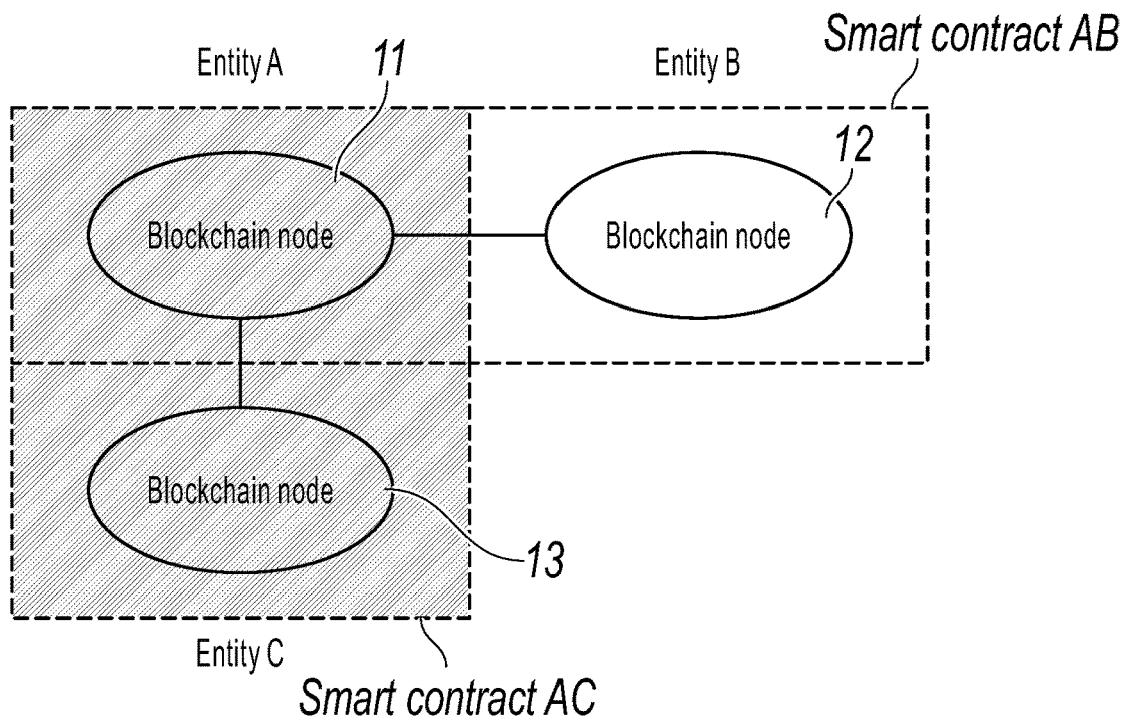
FIG. 4 is a schematic diagram illustrating a system with multiple cooperating parties, according to at least one embodiment of the present specification.

In addition, two cooperating parties are used as an example in FIG. 1. Referring to FIG. 4, entity A serves as a traffic introducing platform, and there can further be more cooperating parties. For example, when entity A and entity B cooperate, the two parties formulate smart contract AB through negotiation. When entity A and entity C cooperate, the two parties formulate smart contract AC through negotiation.

Entity A can separately add different nodes to different blockchain networks. For example, entity A can add blockchain node a1 to a blockchain network where entity A cooperates with entity B, and blockchain node a1 and blockchain node 12 of entity B form a blockchain network. Entity A can further add blockchain node a2 to a blockchain network where entity A cooperates with entity C. The network can include blockchain node a2 and blockchain node 13 of entity C. Correspondingly, blockchain node a1 and blockchain node 12 can store smart contract AB, blockchain node a2 and blockchain node 13 can store smart contract AC, and blockchain node a1 and blockchain node a2 can separately execute the corresponding smart contract to generate a blockchain.

In another case, entity A, entity B, and entity C jointly formulate a smart contract through negotiation, that is, the smart contract is formulated by multi-party cooperation. Therefore, a method for traffic statistics collection is basically the same as the method in FIG. 2 above, and details are omitted here. In a blockchain network including entity A, entity B, and entity C, each entity can maintain a blockchain, and the blockchain can record traffic statistics information of the three cooperating entities. For example, in block 100 in FIG. 3, there can be both traffic of entity B and traffic of entity C.

However, although each entity in the multi-party cooperation maintains a blockchain that records traffic of the entity, data in the blockchain cannot be randomly viewed. For example, entity B cannot randomly view traffic of entity C on the blockchain, and entity C cannot randomly view traffic of entity B on the blockchain. In actual implementation, for example, for verification on the traffic of entity B, entity A can send the traffic to entity B for verification. Entity A can use a public key corresponding to entity B to encrypt traffic statistics information corresponding to entity B, and then send the traffic statistics information to a node of entity B, so that the blockchain node of entity B uses a private key corresponding to the public key for decryption. Similarly, when synchronously verifying recorded traffic with entity C, entity A can use a public key corresponding to entity C to encrypt traffic statistics information corresponding to entity C, and then send the traffic statistics information to a node of entity C. After the verification succeeds, the verified information can be encrypted when being added to the blockchain. For example, data of entity B can be encrypted by using a public key of entity B, and data of entity C can be encrypted by using a public key of entity C. Each entity in the multi-party cooperation can synchronize the blockchain and record data in the blockchain. However, the data is encrypted and cannot be randomly viewed. For example, only entity C can use its own private key to view its own data in the blockchain, but entity C cannot view the data of entity B in the blockchain.

In addition, operation permissions of a blockchain node can be controlled by setting a read/write permission or introducing an account permission. The present solution provides a decentralized event tracking-based statistics collection method, which reduces costs caused by inconsistent practice or technical implementation errors to 0. The present solution features distributed fault tolerance, tamper resistance, and traceability.

Figure 5:
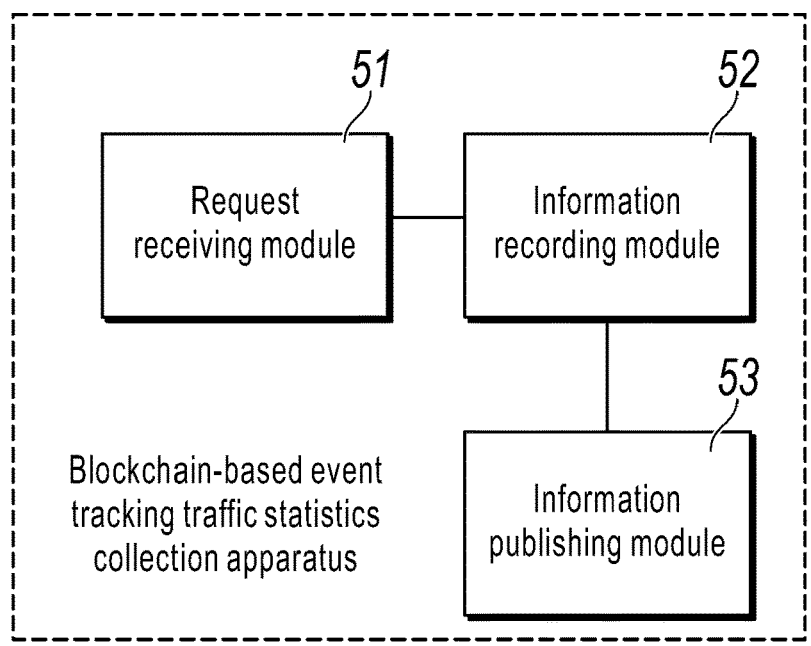
FIG. 5 shows a blockchain-based traffic statistics collection apparatus, according to at least one embodiment of this specification.

At least one embodiment of the present specification further provides a blockchain-based traffic statistics collection apparatus. As shown in FIG. 5, the apparatus can include a request receiving module 51, an information recording module 52, and an information publishing module 53.

The request receiving module 51 is configured to receive a traffic access request triggered by event tracking.

The information recording module 52 is configured to, in response to the traffic access request, invoke traffic recording logic stated in a smart contract published on a blockchain to record traffic statistics information for current traffic access.

The information publishing module 53 is configured to publish the traffic statistics information to the blockchain.

In some examples, the information publishing module 53 is further configured to, before publishing the traffic statistics information to the blockchain, synchronize the recorded traffic statistics information to the blockchain network so that blockchain nodes in the blockchain network verify the traffic statistics information based on information verification logic stated in the smart contract.

In some examples, the information recording module 52 is specifically configured to invoke the traffic recording logic in the smart contract to record at least one item of the following traffic statistics information: an identifier of a user of the current traffic access, a traffic access timestamp, and a traffic destination identifier.

At least one embodiment of the present specification further provides a blockchain-based event tracking traffic statistics collection device. The device includes a memory and a processor. The memory is configured to store an executable instruction that can be run on the processor. When executing the instruction, the processor is configured to implement the blockchain-based traffic statistics collection method according to any of the embodiments of the present specification.

It is worthwhile to further note that the terms "include", "comprise", or their any other variants are intended to cover a non-exclusive inclusion, so that a process, a method, an article, or a device that includes a list of elements not only includes those elements but also includes other elements which are not expressly listed, or further includes elements inherent to such a process, method, article, or device. An element preceded by "includes a . . . " does not, without more constraints, preclude the existence of additional identical elements in the process, method, article, or device that includes the element.

A person skilled in the art should understand that the one or more embodiments of the present specification can be provided as a method, a system, or a computer program product. Therefore, the one or more embodiments of the present specification can use a form of hardware only embodiments, software only embodiments, or embodiments with a combination of software and hardware. In addition, the one or more embodiments of the present specification can use a form of a computer program product that is implemented on one or more computer-usable storage media (including but not limited to a disk memory, a CD-ROM, an optical memory, etc.) that include computer-usable program code.

The one or more embodiments of the present specification can be described in common contexts of computer-executable instructions executed by a computer, such as a program module. Generally, the program module includes a routine, a program, an object, a component, a data structure, etc. executing a specific task or implementing a specific abstract data type. The one or more embodiments of the present specification can also be practiced in distributed computing environments. In the distributed computing environments, tasks are performed by remote processing devices that are connected through a communications network. In a distributed computing environment, the program module can be located in both local and remote computer storage media including storage devices.

The embodiments in the present specification are described in a progressive way. For same or similar parts of the embodiments, references can be made to the embodiments mutually. Each embodiment focuses on a difference from other embodiments. Particularly, a data processing device embodiment is similar to a method embodiment, and therefore, is described briefly. For related parts, reference can be made to partial descriptions in the method embodiment.

Specific embodiments of the present specification are described above. Other embodiments fall within the scope of the appended claims. In some situations, the actions or steps described in the claims can be performed in an order different from the order in the embodiments and the desired results can still be achieved. In addition, the process depicted in the accompanying drawings does not necessarily need a particular execution order to achieve the desired results. In some implementations, multi-tasking and concurrent processing are feasible or can be advantageous.

The descriptions above are only example embodiments of one or more embodiments of the present specification, but are not intended to limit the one or more embodiments of the present specification. Any modification, equivalent replacement, improvement, etc. made without departing from the spirit and principle of the one or more embodiments of the present specification shall fall within the protection scope of the one or more embodiments of the present specification.

What is claimed is:

1. A computer-implemented method, performed by a blockchain node in a blockchain network, comprising:
   receiving, at the blockchain node, a traffic access request triggered by event tracking, wherein the blockchain node is associated with a first entity;
   in response to receiving the traffic access request, invoking, at the blockchain node, traffic recording logic in a smart contract published on a blockchain;
   recording traffic statistics information of current traffic access in response to invoking the traffic recording logic, wherein the current traffic access is associated with traffic from the first entity to a second entity, and wherein the smart contract further comprises information verification logic associated with verification of the traffic statistics information;
   synchronizing the traffic statistics information with a second node in the blockchain network, wherein the second node is associated with the second entity, and wherein synchronizing the traffic statistics information with the second node in the blockchain network comprises:
      encrypting, by the blockchain node and as encrypted traffic statistics information, the traffic statistics information using a public key, wherein the public key corresponds to the second entity;
      sending, by the blockchain node, the encrypted traffic statistics information to the second node; and
      receiving, at the blockchain node and from the second node, indication that the encrypted traffic statistics information is verified by the second node after decryption with a private key corresponding to the public key; and
   publishing the traffic statistics information to the blockchain when a blockchain update condition is satisfied.

2. The computer-implemented method of claim 1, wherein recording the traffic statistics information of current traffic access comprises:
   recording at least one of the following: an identifier of a user of the current traffic access, a traffic access timestamp, or a traffic destination identifier.

3. The computer-implemented method of claim 1,
   wherein the blockchain update condition comprises one of the following: a total amount of the traffic statistics information reaches a predetermined amount threshold, and a time interval between a current time and a time of generation of a previous blockchain block reaches a predetermined interval threshold.

4. The computer-implemented method of claim 1, wherein the publishing the traffic statistics information to the blockchain comprises:
   storing, in a new block of the blockchain, the traffic statistics information;
   determining a hash value of the new block using the traffic statistics information, a timestamp of a time when the new block is generated, and a hash value of a previous blockchain block; and
   storing, in the new block of the blockchain, the timestamp of the time when the new block is generated, the hash value of the previous blockchain block, and the hash value of the new block.

5. The computer-implemented method of claim 1, wherein a type of the current traffic access is introducing traffic to a target website through a third-party platform.

6. A non-transitory, computer-readable medium storing one or more instructions executable by a computer system to perform, at a blockchain node of a blockchain network, operations for blockchain-based smart contract execution, wherein the operations comprise:
   receiving, at the blockchain node, a traffic access request triggered by event tracking, wherein the blockchain node is associated with a first entity;
   in response to receiving the traffic access request, invoking, at the blockchain node, traffic recording logic in a smart contract published on a blockchain;
   recording traffic statistics information of current traffic access in response to invoking the traffic recording logic, wherein the current traffic access is associated with traffic from the first entity to a second entity, and wherein the smart contract further comprises information verification logic associated with verification of the traffic statistics information;
   synchronizing the traffic statistics information with a second node in the blockchain network, wherein the second node is associated with the second entity, and wherein synchronizing the traffic statistics information with the second node in the blockchain network comprises:
      encrypting, by the blockchain node and as encrypted traffic statistics information, the traffic statistics information using a public key, wherein the public key corresponds to the second entity;
      sending, by the blockchain node, the encrypted traffic statistics information to the second node; and
      receiving, at the blockchain node and from the second node, indication that the encrypted traffic statistics information is verified by the second node after decryption with a private key corresponding to the public key; and
   publishing the traffic statistics information to the blockchain when a blockchain update condition is satisfied.

7. The non-transitory, computer-readable medium of claim 6, wherein recording the traffic statistics information of current traffic access comprises:
   recording at least one of the following: an identifier of a user of the current traffic access, a traffic access timestamp, or a traffic destination identifier.

8. The non-transitory, computer-readable medium of claim 6,
   wherein the blockchain update condition comprises one of the following: a total amount of the traffic statistics information reaches a predetermined amount threshold, and a time interval between a current time and a time of generation of a previous blockchain block reaches a predetermined interval threshold.

9. The non-transitory, computer-readable medium of claim 6, wherein the publishing the traffic statistics information to the blockchain comprises:
- storing, in a new block of the blockchain, the traffic statistics information;
- determining a hash value of the new block using the traffic statistics information, a timestamp of a time when the new block is generated, and a hash value of a previous blockchain block; and
- storing, in the new block of the blockchain, the timestamp of the time when the new block is generated, the hash value of the previous blockchain block, and the hash value of the new block.

10. The non-transitory, computer-readable medium of claim 6, wherein a type of the current traffic access is introducing traffic to a target website through a third-party platform.

11. A computer-implemented system, comprising:
- one or more computers; and
- one or more computer memory devices interoperably coupled with the one or more computers and having tangible, non-transitory, machine-readable media storing one or more instructions that, when executed by the one or more computers, perform, at a blockchain node of a blockchain network, one or more operations for blockchain-based smart contract execution, wherein the one or more operations comprise:
  - receiving, at the blockchain node, a traffic access request triggered by event tracking, wherein the blockchain node is associated with a first entity;
  - in response to receiving the traffic access request, invoking, at the blockchain node, traffic recording logic in a smart contract published on a blockchain;
  - recording traffic statistics information of current traffic access in response to invoking the traffic recording logic, wherein the current traffic access is associated with traffic from the first entity to a second entity, and wherein the smart contract further comprises information verification logic associated with verification of the traffic statistics information;
  - synchronizing the traffic statistics information with a second node in the blockchain network, wherein the second node is associated with the second entity, and wherein synchronizing the traffic statistics information with the second node in the blockchain network comprises:
    - encrypting, by the blockchain node and as encrypted traffic statistics information, the traffic statistics information using a public key, wherein the public key corresponds to the second entity;
    - sending, by the blockchain node, the encrypted traffic statistics information to the second node; and
    - receiving, at the blockchain node and from the second node, indication that the encrypted traffic statistics information is verified by the second node after decryption with a private key corresponding to the public key; and
  - publishing the traffic statistics information to the blockchain when a blockchain update condition is satisfied.

12. The computer-implemented system of claim 11, wherein recording the traffic statistics information of current traffic access comprises:
- recording at least one of the following: an identifier of a user of the current traffic access, a traffic access timestamp, or a traffic destination identifier.

13. The computer-implemented system of claim 11, wherein the blockchain update condition comprises one of the following: a total amount of the traffic statistics information reaches a predetermined amount threshold, and a time interval between a current time and a time of generation of a previous blockchain block reaches a predetermined interval threshold.

14. The computer-implemented system of claim 11, wherein the publishing the traffic statistics information to the blockchain comprises:
- storing, in a new block of the blockchain, the traffic statistics information;
- determining a hash value of the new block using the traffic statistics information, a timestamp of a time when the new block is generated, and a hash value of a previous blockchain block; and
- storing, in the new block of the blockchain, the timestamp of the time when the new block is generated, the hash value of the previous blockchain block, and the hash value of the new block.

* * * * *